(12) United States Patent
Burnham

(10) Patent No.: US 6,796,146 B2
(45) Date of Patent: Sep. 28, 2004

(54) METHOD FOR MANUFACTURING PATTERNED GLASS PRODUCTS

(75) Inventor: James Burnham, Torrance, CA (US)

(73) Assignee: Guardian Industries Corp., Auburn Hills, MI (US)

(*) Notice: Subject to any disclaimer, the term of this patent is extended or adjusted under 35 U.S.C. 154(b) by 94 days.

(21) Appl. No.: 10/058,226

(22) Filed: Jan. 29, 2002

(65) Prior Publication Data
US 2002/0102388 A1 Aug. 1, 2002

Related U.S. Application Data

(63) Continuation-in-part of application No. 09/585,388, filed on Jun. 2, 2000, now Pat. No. 6,372,327.

(51) Int. Cl.[7] .............................. C03B 11/00
(52) U.S. Cl. .................... 65/93; 65/95; 65/97
(58) Field of Search ............... 65/66, 90, 93, 65/94, 95, 100, 101, 97, 99

(56) References Cited

U.S. PATENT DOCUMENTS

| | | | | |
|---|---|---|---|---|
| 370,176 A | | 9/1887 | Brogan et al. | |
| 370,178 A | | 9/1887 | Brogan et al. | |
| 720,138 A | | 2/1903 | Hartung | |
| 720,139 A | | 2/1903 | Hartung | |
| 737,707 A | | 9/1903 | Chance | |
| 742,898 A | * | 11/1903 | Page et al. ................. | 65/93 |
| 1,528,194 A | | 3/1925 | Burgess | |
| 1,831,060 A | * | 11/1931 | Drake ........................ | 65/93 |
| 1,895,362 A | * | 1/1933 | Allison ...................... | 65/93 |
| 1,934,798 A | * | 11/1933 | Gelstharp .................. | 65/44 |
| 3,116,166 A | | 12/1963 | Halley | |
| 3,183,140 A | | 5/1965 | Gibson, Jr. | |
| 3,554,725 A | * | 1/1971 | Bracken et al. ............ | 65/185 |
| 3,841,857 A | * | 10/1974 | Harcuba .................... | 65/94 |
| 3,847,582 A | * | 11/1974 | Kozmin ..................... | 65/33.3 |
| 3,900,329 A | * | 8/1975 | Grubb et al. .............. | 501/70 |
| 3,914,118 A | * | 10/1975 | Brooke et al. ............. | 65/95 |
| 3,961,929 A | | 6/1976 | Stockdale | |
| 4,127,689 A | | 11/1978 | Holt | |
| 4,323,423 A | | 4/1982 | Schrunk | |
| 4,427,729 A | | 1/1984 | Messer | |
| 4,612,030 A | | 9/1986 | Smids | |
| 4,619,850 A | | 10/1986 | Charlton | |
| 5,182,171 A | | 1/1993 | Aoyama et al. | |
| 5,414,968 A | | 5/1995 | Willner | |
| 5,460,638 A | * | 10/1995 | Lock ......................... | 65/67 |
| 5,622,019 A | | 4/1997 | Dorough, Jr. | |
| 5,631,057 A | | 5/1997 | Sundet | |
| 5,721,013 A | | 2/1998 | Pratt | |
| 5,780,726 A | | 7/1998 | Bastawros et al. | |
| 5,840,407 A | | 11/1998 | Futhey et al. | |
| 5,888,263 A | | 3/1999 | Nakata | |
| 6,372,327 B1 | * | 4/2002 | Burnham et al. .......... | 428/156 |

OTHER PUBLICATIONS

U.S. patent application Ser. No. 09/585,388, filed Jun. 2, 2000 (Parent Case).

* cited by examiner

Primary Examiner—Steven P. Griffin
Assistant Examiner—Carlos Lopez
(74) Attorney, Agent, or Firm—Nixon & Vanderhye P.C.

(57) ABSTRACT

A method and apparatus for manufacturing patterned glass sheets. In certain embodiments, the resulting glass sheets have a pattern defined therein which is designed so as to simulate conventional glue chipped glass sheets or antique glass. A heated glass ribbon exits a furnace or melter and proceeds through a nip defined between opposing rollers. Pressure on one or both of the rollers in the direction of the nip, combined with a glue chipped simulating pattern or antique pattern defined in an exterior surface of at least one of the rollers, causes the pattern to be transferred from the roller(s) into/onto a surface(s) of the hot glass ribbon. After being patterned, the glass ribbon is annealed and cut into a plurality of different sheets.

9 Claims, 6 Drawing Sheets

METHOD FOR MANUFACTURING PATTERNED GLASS PRODUCTS

This application is a continuation-in-part (CIP) of U.S. application Ser. No. 09/585,388, filed Jun. 2, 2000 now U.S. Pat. No. 6,372,327), the disclosure of which is hereby incorporated herein by reference.

This invention relates to a method and apparatus for manufacturing patterned glass products. In particular, this invention relates to a method and apparatus for manufacturing patterned glass products having an appearance similar to or simulating the appearance of glue chipped glass or antique glass.

BACKGROUND OF THE INVENTION

Glue chipped glass is known in the art. For example, see U.S. Pat. No. 4,427,729, the disclosure of which is hereby incorporated herein by reference.

Conventionally, glue chipped glass is manufactured as follows. The manufacturer typically does not have glass making capability and thus begins with an annealed sheet of glass. The manufacturer then lightly roughens a surface of the glass sheet (e.g., via sand blasting). After the surface has been roughened, a solution of glue is applied on the roughened surface of the glass to a prescribed thickness (e.g., via spraying). Typically, the glue may consist of a common animal protein gelatin which may be purchased in dry powder form and mixed into solution form prior to application. Optionally, the glue may be preheated depending upon the effect desired, as heat and moisture both contribute to the appearance to the final product.

After the glue has been applied to the roughened surface, the glue is oven dried (i.e., heat dried). Optionally, following oven drying, the glue coated glass may be permitted to air dry. As the glass dries, it begins to form crystals which peel or "chip" away from the glass surface. Chipping is allowed to continue for a prescribed period of time, after which any remaining chips are simply brushed from the surface. The end result is a cut or chipped glass pattern as shown in FIG. 1, which resembles somewhat that of a fossil pattern (i.e., glue-chipped glass). The resulting product is esthetically attractive and has numerous applications in interior decorating, and the like.

Unfortunately, in the glue chipped glass manufacturing process described above the pattern of crystal growth cannot be controlled. To the contrary, the pattern is essentially random. Thus, the aforesaid process cannot be utilized to produce large quantities of glue chipped glass products in accurately duplicated patterns.

U.S. Pat. No. 4,427,729 discloses a method and apparatus for manufacturing glue chipped glass, as shown in FIG. 2. Referring to FIG. 2, the apparatus of the '729 patent includes a pair of rollers 1 and 3, defining nip 5 therebetween. Glue is fed through manifold 7 and exits the manifold at a desired thickness 9. Rollers 1 and 3 cause the glue 11 to be deposited on the roughened surface of glass 13. Conveyor 15 conveys the glass 13 below nip 5 whereafter the glass is conveyed to an oven where the glue is dried and chips off the glass.

Unfortunately, the system and apparatus of the '729 patent are undesirable for one or more of the following reasons. First, the requirement for the glue is burdensome and can be messy in certain manufacturing environments. Second, the time and structure required for the drying process is undesirable. Third, the structure and time required for the sweeping away of and collection of glue chips is undesirable. Fourth, the glue chipped pattern cannot practically be repeated on a regular basis in an accurate manner.

"Antique glass" is known in the art as glass having random striations running generally therethrough in random directions/angles. U.S. Pat. No. 4,612,030 discloses a method of making antique glass. In particular, the '030 Patent uses a "rake" positioned downstream of a furnace in order to form the striations in the glass when the glass is still in a somewhat soft state.

Unfortunately, the method of making antique glass described in the '030 Patent relies upon the rake to impose the striations into the glass. This is undesirable in that the rake is subject to breaking, and often cannot enable a uniform pattern to be formed in the glass in an efficient manner over long periods of time. Use of the rake of the '030 Patent is also undesirable in that it is difficult to control the depth of the striations formed in the glass thereby.

In view of the above, it will be apparent to those skilled in the art that there exists a need in the art for addressing and/or solving any one or more of the aforesaid problems in the manufacture of a glass sheet having a look similar to conventional glue-chipped glass or antique glass.

SUMMARY OF THE INVENTION

An object of this invention is to provide a method and apparatus for manufacturing patterned glass sheets.

Another object of this invention is to provide a method and apparatus for manufacturing glass sheets having at least one pattern thereon in a manner so as to simulate either (i) a glue chipped type glass sheet, or (ii) an antique glass sheet.

Another object of this invention is to provide a method which enables a repeatable pattern that simulates a glue chipped type or antique type glass sheet to be repeatedly applied to a surface of a ribbon of glass in a consistent manner.

Another object of this invention is to satisfy and/or fulfill one or more of the aforesaid objects and/or needs.

Certain example embodiments of this invention fulfill one or more of the above-listed objects and/or needs by providing a method of manufacturing patterned glass sheets having a visual appearance simulating an appearance of antique glass, the method comprising: providing a furnace or melter; providing first and second opposing rollers which define a nip therebetween, and providing at least one of the first and second rollers with an antique glass pattern comprising a plurality of intersecting ridges of different lengths defined in an exterior surface thereof, wherein at least some of the ridges intersect one another at angles of from about 5–80 degrees; a ribbon of glass exiting the furnace or melter and proceeding toward the nip; the ribbon of glass reaching the nip between the first and second rollers at a temperature of from about 1,900–2,4000° F.; forming an antique pattern in at least one surface of the glass ribbon in the nip, by causing the antique glass pattern to be transferred from the at least one roller to the ribbon of glass; the patterned glass ribbon exiting the nip; annealing the patterned glass ribbon after the ribbon has left the nip; and cutting the patterned glass ribbon into a plurality of sheets which simulate antique glass sheets from a visual perspective.

Certain other example embodiments of this invention fulfill one or more of the above listed objects and/or needs by providing a patterned glass sheet aesthetically resembling a conventional antique glass sheet, the patterned glass sheet comprising: a sheet of glass including first and second opposing major surfaces; a pattern simulating a conventional antique pattern defined in at least one of said first and second major surfaces of said sheet of glass; wherein said pattern includes a plurality of intersecting striations (e.g., grooves)

of different lengths formed by a pattern roller and defined in said surface of said sheet, said striations being formed of glass; and wherein certain of said striations intersect others of the striations in a manner such that the pattern simulates a conventional antique pattern.

This invention will now be described with respect to certain embodiments thereof, accompanied by certain illustrations.

IN THE DRAWINGS

DETAILED DESCRIPTION FOR CERTAIN EMBODIMENTS OF THIS INVENTION

Figure 1:
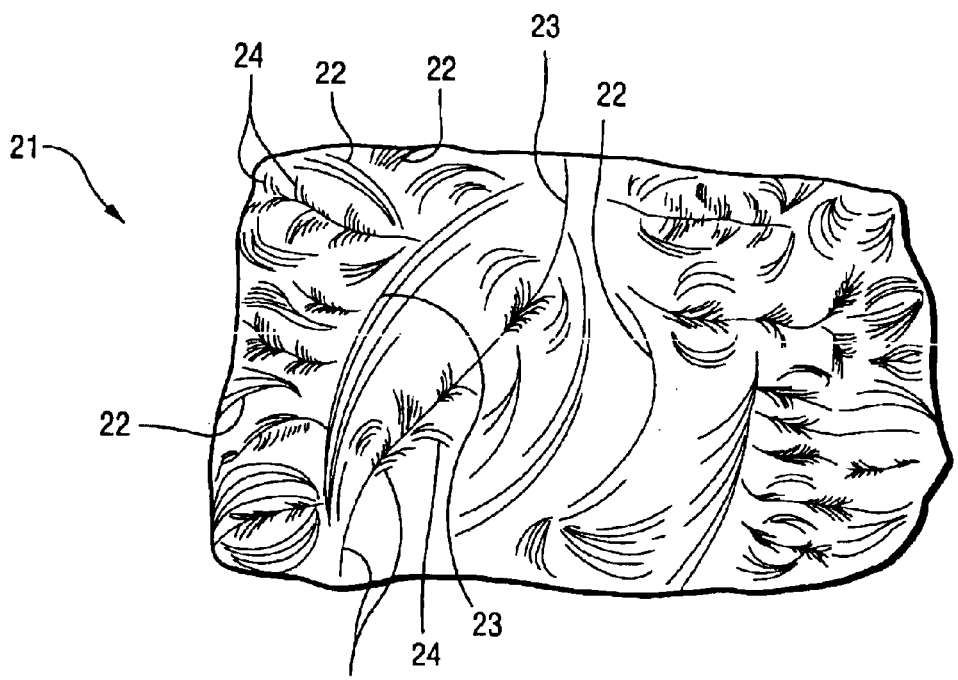
FIG. 1 is a top plan view of a patterned glass sheet according to an example embodiment of this invention (simulating glue chipped).
Figure 2:
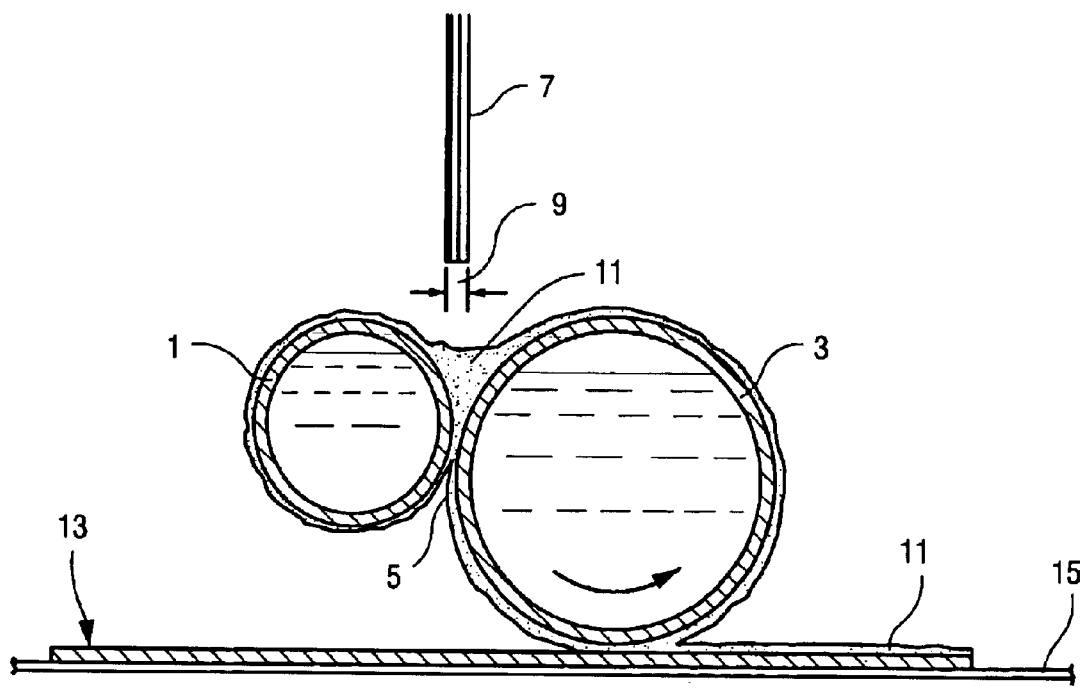
FIG. 2 is a side cross-sectional view of a prior art apparatus for manufacturing glue chipped type glass sheets.

Referring now more particularly to the accompanying drawings, in which like reference numerals represent like parts throughout the several views.

FIG. 1 illustrates a patterned glass sheet 21 according to an embodiment of this invention. At least one surface of the glass sheet 21 includes a pattern formed therein as illustrated, so that sheet 21 from a visual appearance standpoint simulates a conventional glue chipped glass sheet. As shown in FIG. 1, the pattern formed in the glass surface may include a plurality of grooves, canyons and/or plateaus in the surface(s) of the glass sheet. The pattern includes a plurality of curved lines 22, many of which intersect, of many different shapes and sizes. Some curved lines making up the fossil like pattern are short, while others are long. As illustrated, short curved lines 22 often intersect long curved lines 22 formed in the glass surface. Certain of the longer curved lines (e.g., 23) are at least twice as long as certain curved lines of shorter length (e.g., 24), more preferably at least about five (5) times as long, and even more preferably at least about ten (10) times as long. These lines 22–24 are formed in the surface of the glass sheet by an impressing roll or roller 35 that includes a pattern formed in/on its outer glass engaging surface as will be discussed in more detail below. The glue chip simulating pattern of lines 22–24 renders glass sheet 21 aesthetically pleasing, in a manner such that sheet 21 appears similar to a conventional glue chipped glass sheet. Thus, patterned glass sheet 21 may be utilized in certain interior decorating applications, and other like applications, where an esthetically pleasing patterned look is desired. The pattern is repeatable.

As can be seen, many of the lines or ridges 22–24 intersect other of the lines or ridges. Most intersections are not at 90 degree angles. To the contrary, at least half of the line/ridge intersections are at intersection angles of from about 5–80 degrees, more preferably from about 5–60 degrees, and most preferably from about 5–50 degrees. These intersection angles enable the patter to simulate a conventional glue chipped pattern.

While patterned sheet 21 has a look or appearance similar to that of a conventional glue chipped glass sheet, sheet 21 does not require the application of glue, does not require the oven drying associated with conventional glue chipped processes, does not require collection of glue chips, and the pattern can be repeated on a regular basis without substantial difficulty. Thus, it will be appreciated that the resulting sheet 21 and the process of manufacturing the same have many advantages over conventional glue chipped glass sheets and their corresponding methods of manufacture. Moreover, it is noted that glass sheet 21 may or may not be thermally tempered in different embodiments of this invention.

Figure 3:
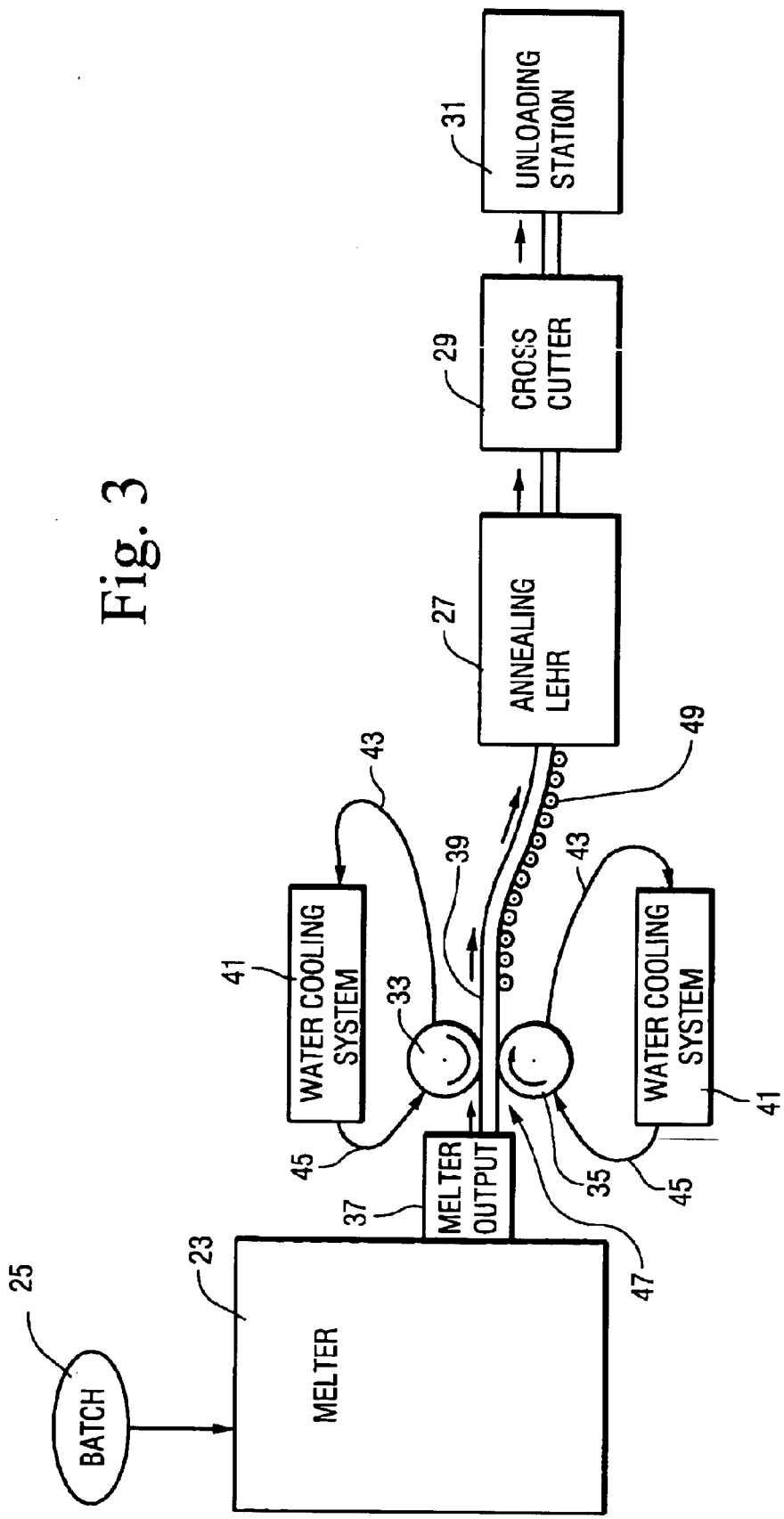
FIG. 3 is a schematic diagram illustrating an apparatus for manufacturing patterned glass sheets which simulate glue chipped glass or antique glass in appearance according to an example embodiment of this invention.

FIG. 3 is a schematic diagram illustrating an apparatus and/or method for manufacturing patterned sheet 21. The apparatus includes melter 23 for receiving glass batch materials 25, annealing lehr 27, cross-cutter 29 for cutting the glass ribbon, and unloading station 31 where cut glass sheets including line 22–24 inclusive patterns thereon are unloaded from the apparatus. Moreover, the apparatus and/or system includes first and second water cooled rollers 33 and 35 which receive the hot glass ribbon from melter output 37. At least one of rollers 33, 35 (preferably only lower roller 35) includes a pattern (including peaks/valleys/ridges/plateaus) defined in its outer glass engaging surface so that when the hot glass ribbon 39 passes through the nip 47 between rollers 33 and 35, this pattern (see FIG. 1) is embossed or formed in a surface (preferably the lower surface) of the ribbon. The pattern is preferably applied so as to be provided across the entire surface (or a substantial portion of the surface area) of one side of the glass sheet.

In certain preferred embodiments, bottom roller 35 includes the pattern defined in a surface thereof, while upper roller 33 may have a smooth outer surface or optionally a slightly roughened (e.g., via sand blasting) but non-patterned outer surface. In alternative embodiments of this invention, each of rollers 33 and 35 may have a pattern defined in their respective outer glass engaging surfaces so that patterns may be formed on both sides of the resulting glass sheets.

Still referring to FIG. 3, a water cooling system (s) 41 is provided for cooling rollers 33, 35 so that the rollers may be maintained at relatively low temperatures relative to the hot glass ribbon 39 which flows therebetween. In the FIG. 3 embodiment, each roller 33, 35 has its own recirculating water cooling system 41 where water flows from the roller at 43, is cooled at 41, and then flows back into the roller at 45 at a lesser temperature. In other embodiments of this invention, a single recirculating water cooling system 41 may service both rollers 33, 35. In yet other embodiments, water cooling systems 41 may be used that are not of the recirculating type.

As discussed above, the pattern shown in FIG. 1 is formed in at least one surface of the hot glass ribbon 39 at the nip 47 between rollers 33 and 35. After exiting nip 47, the cooler (but still hot) patterned glass ribbon with pattern therein rolls across a plurality of rollers 49 before entering annealing lehr 27.

In certain embodiments of this invention, lehr 27 may have a plurality of different zones. In a first zone within lehr 27, the temperature of the patterned glass ribbon 39 may be stabilized. Then, the patterned glass ribbon 39 may be moved/conveyed into an annealing zone of the lehr 27 where the glass is annealed. After leaving the annealing zone, the patterned glass ribbon may be moved to a cooling zone before exiting lehr 27. Thereafter, the annealed and patterned glass ribbon 39 may be cut into sheets at cross-cutter 29 and thereafter unloaded from the apparatus at station 31.

In certain preferred embodiments of this invention, nip 47 defined between rollers 33 and 35 is rather close in proximity to the output 37 of melter 23. An exemplary melter output 37 could be the melter's knife gate, or any other suitable output. Nip 47 is positioned in close proximity to melter output 37 so that the temperature of the glass ribbon 39 upon reaching nip 47 is within the range of from about 1900–2400° F., more preferably from about 2000–2300° F., and most preferably from about 2100–2200° F. By controlling the glass ribbon so that it is at such a temperature upon reaching nip 47, the glue chipped simulating pattern may be formed in nip 47 in an efficient manner so as to not result in adverse effects upon the final glass product.

The water within hollow rollers 33 and 35 is preferably maintained at a temperature of from about 70–125° F., more preferably at a temperature of from about 80–100° F. Accordingly, the surfaces of rollers 33 and 35 are maintained at respective temperatures well below that of the glass ribbon 39 passing therebetween. This causes the glass ribbon 39 to cool as it passes through nip 47 as the glue chipped simulating pattern is formed therein.

Preferably, upon leaving nip 47, the temperature of patterned glass ribbon 39 is from about 1100–1600° F., more preferably from about 1240–14000° F. It is noted that the refractory temperature within melter 23 is preferably from about 2400–2700° F., more preferably about 2640° F. After leaving nip 47, the patterned glass ribbon 39 is conveyed to and through lehr 27 as discussed above, then cut into sheets by cross cutter 29 and finally unloaded from the apparatus at station 31.

In certain preferred embodiments of this invention, roller 35 is a patterned roller while roller 33 is a substantially smooth roller as discussed above. Thus, the pattern (see FIG. 1, or alternatively FIG. 6) formed in a lower surface of glass ribbon 39 comes from the exterior surface of roller 35. In certain embodiments, roller 35 may be a chrome plated or chromed steel roller with the pattern formed in its exterior chrome inclusive surface. Meanwhile, non-patterned (i.e., essentially smooth with optional slight roughening via sandblasting or the like) top roller 33 may be a chrome plated roller or alternatively a simple stainless steel roller.

Figure 4:
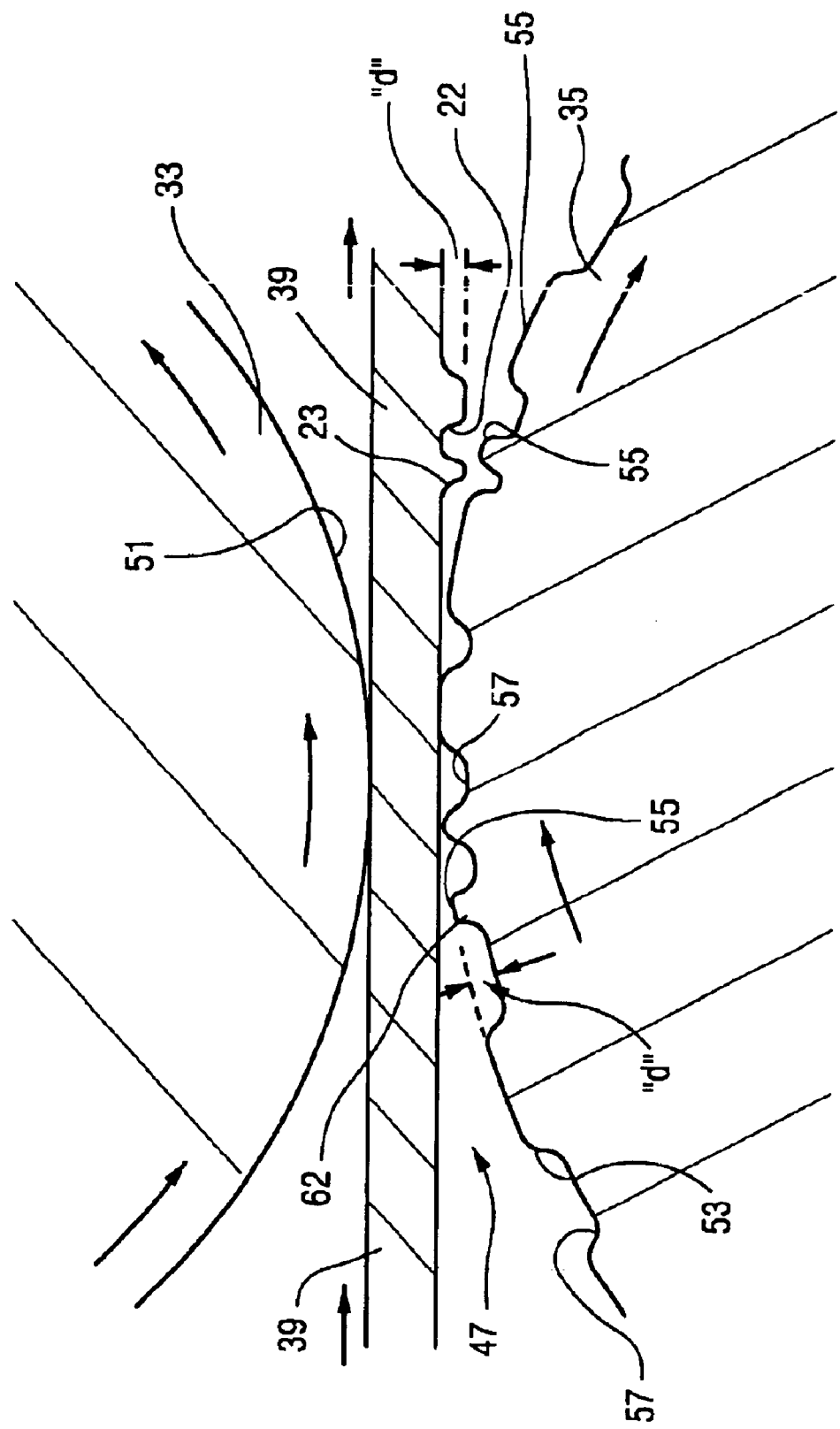
FIG. 4 is a side cross-sectional view of the patterning nip of the apparatus of FIG. 3, with a sheet of glass therebetween.

FIG. 4 is a side cross-sectional view of nip 47, including the glass contacting exterior surfaces of the opposing rollers 33, 35 with the glass ribbon 39 therebetween. As illustrated, prior to reaching the nip between rollers 33 and 35, hot glass ribbon 39 has no pattern formed therein and is thus substantially flat on each of its opposing surfaces. However, upon passing through the nip between the rollers, the pattern defined in the exterior surface of pattern roller 35 (which is the inverse of the pattern shown in FIG. 1) is imparted into or onto the glass ribbon so that the ribbon 39 has a pattern including lines 22–24 defined on its lower surface upon leaving the nip. In the FIG. 4 embodiment, the exterior surface 51 of top roller 33 is substantially smooth (although it may be sand blasted in order to slightly roughened it in certain embodiments). Thus, resulting glass sheets 21 preferably are approximately smooth on one major surface and have the glue chip simulating pattern 22–24 formed in the other major surface.

The glue chip simulating pattern is made up of the various peaks 55 and valleys 57 defined in the exterior surface 53. These peaks/valleys define lines or ridges at the interface(s) which cause lines 22–24 of the glue chip simulating pattern to be formed in a surface(s) of the glass ribbon 39. In certain preferred embodiments of this invention, the average depth "D" of the bottom of the valleys relative to the top of adjacent peaks is from about 0.002–0.020 inches, more preferably from about 0.004–0.010 inches, and most preferably about 0.007 inches. The average depth "D" of valleys to adjacent peaks may vary depending upon the type of pattern desired to be imparted onto the glass ribbon 39. The depth "D" (which in turn defines the depth of lines 22–24 in the surface of the resulting glass sheet 21 in FIG. 1) of different lines/ridges on the surface of roller 35 may be approximately constant across the entire surface of the roller in some embodiments of this invention, but may vary to different depths across the surface of the roller in other embodiments of this invention. Walls or sidewalls 62 between peaks and valleys of the roller 35 correspond to lines 22–24 that are formed in the resulting glass sheet 21. Sidewalls 62 may be at various angles in different embodiments of this invention, such as from about 10 to 90 degrees, more preferably from about 20 to 70 degrees, relative to a base of an adjacent valley or upper surface of an adjacent plateau. The tops and/or bottoms of sidewalls 62 (i.e., where the sidewalls meet with a top surface of a plateau or apex/peak; or where the sidewalls meet with a bottom of a valley) form respective ridges that result in lines 22–24 in the final glass sheet 21 as shown in FIG. 1. Because lines 22–24 are shown in FIG. 1 as being of different lengths and intersecting one another on many occasions, the same is true with regard to the ridges formed in the outer surface of roller 35 (i.e., the ridges in the outer surface of roller 35 are of different lengths and intersect one another). The resulting pattern formed in the lower surface of glass ribbon 39 by the exterior or glass engaging surface 53 of pattern roller 35, causes the final glass sheet product 21 shown in FIG. 1 to visually appear similar to a conventional glue chipped glass sheet.

Figure 5:
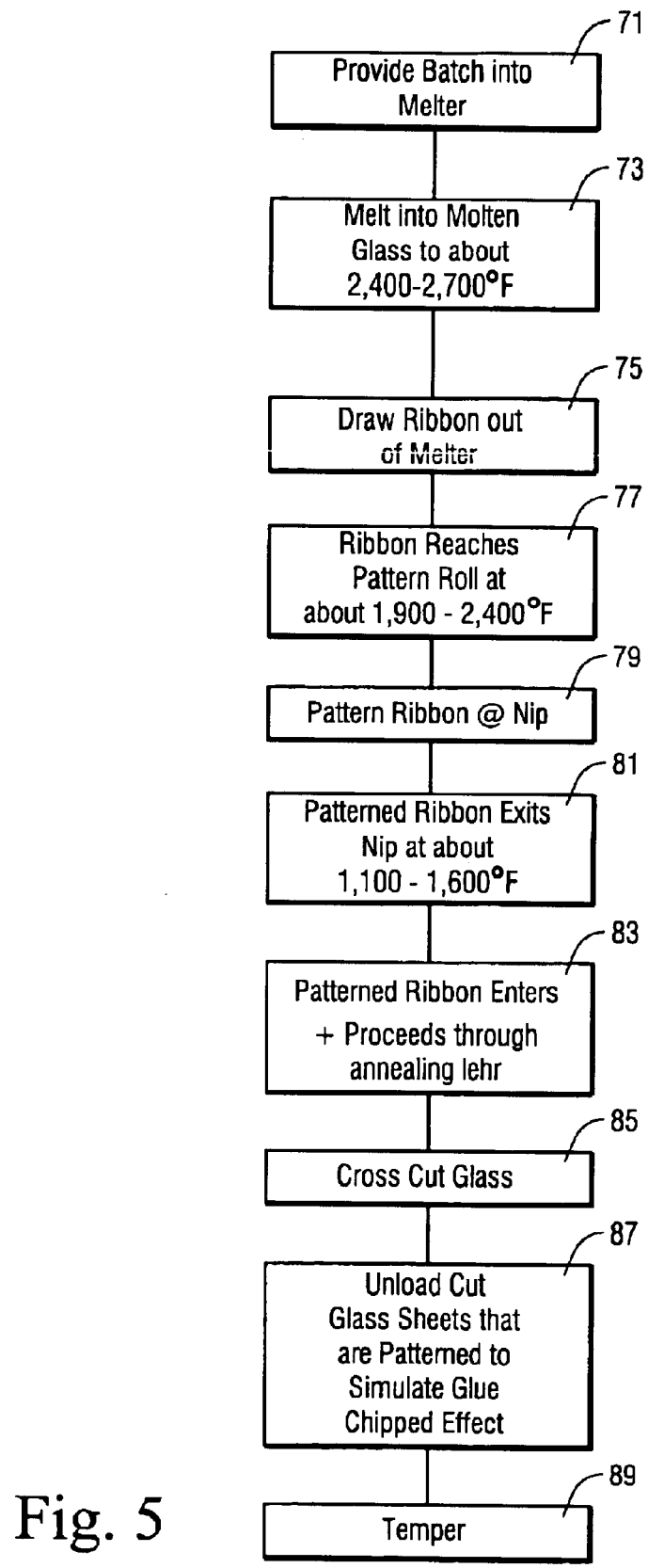
FIG. 5 is a flow chart illustrating various steps taken in the manufacture of patterned glass sheets according to an example embodiment of this invention.

FIG. 5 is a flowchart illustrating certain steps taken according to an embodiment of this invention. Initially, glass material batch, known in the art, is loaded into melter 23 at step 71. The glass batch may be for forming soda-lime-silica glass or any other type of suitable glass. In step 73, the glass batch is melted within the melter and reaches a temperature of from about 2400–2700° F. A glass ribbon 39 is then drawn out of melter 23, in step 75. Optionally, between steps 73 and 75, the ribbon may be forwarded through a refiner for stabilizing the temperature of the ribbon. The ribbon 39 proceeds toward the nip 47 between rollers 33, 35, and reaches the nip at a temperature of from about 1900–2400° F., as illustrated at step 77. In step 79, the pattern on the exterior surface of roller 35 is transferred to the bottom of glass ribbon 39 when the glass ribbon is in the nip 47. In step 81, the patterned ribbon 39 exits the nip at a temperature of from about 1100–1600° F. The patterned ribbon 39 then enters and proceeds through the annealing lehr at step 83. Upon being annealed and exiting the lehr, the glass ribbon is cut into a plurality of sheets at step 85. Thereafter, in step 87, the patterned glass sheets are unloaded from the apparatus at station 31. Thermal tempering at 89 is optional.

The resulting patterned glass sheets aesthetically appear similar to conventional glue chipped sheets, as illustrated by sheet 21 in FIG. 1. Sheets 21 may be from about one-sixteenth to one-half inch(es) thick in certain embodiments of this invention, preferably from about one-eighth to three-eighths inch(es) thick.

Figure 6:
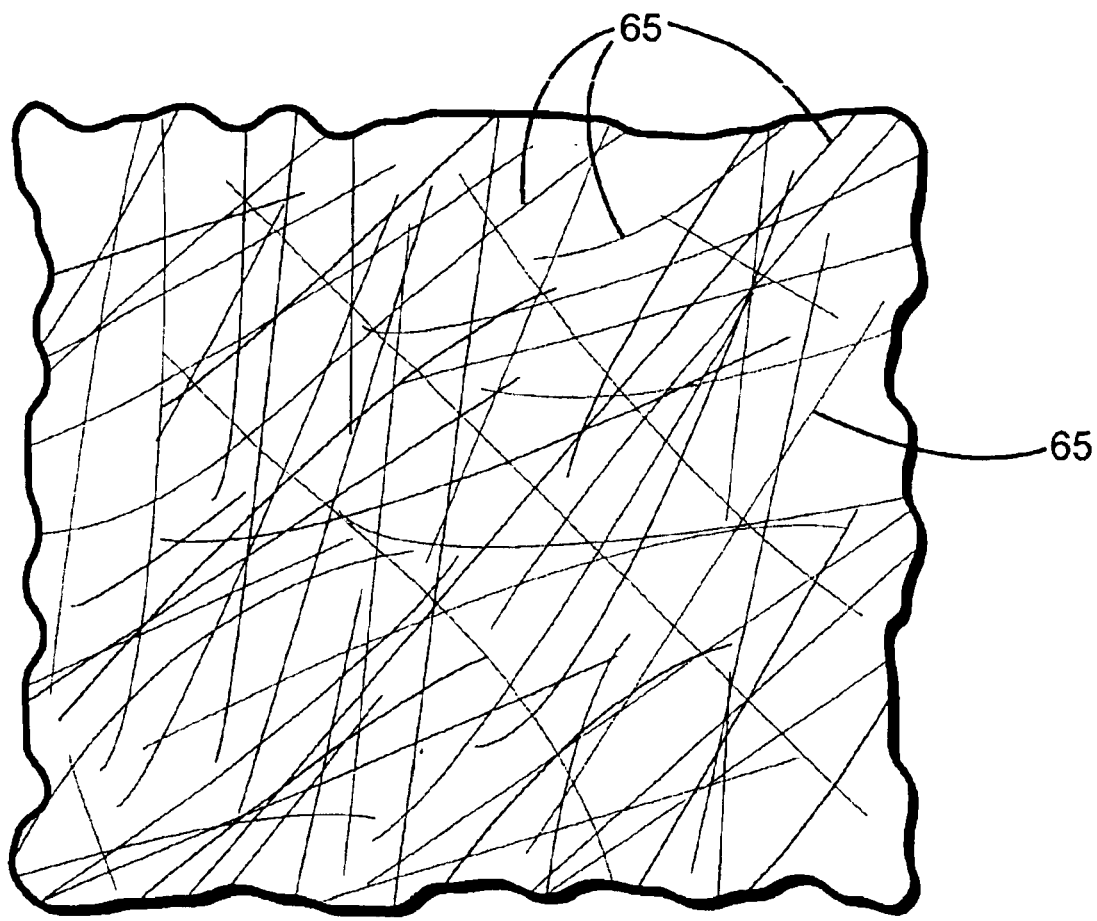
FIG. 6 is a top plan view of a patterned glass sheet having an antique glass look according to an example embodiment of this invention.

The apparatus/technique of FIGS. 3–5 (described above) may instead be used to making patterned glass having an antique glass pattern therein in alternative embodiments of this invention. In this regard, FIG. 6 illustrates a portion of a patterned glass sheet having an antique glass pattern formed therein according to an example embodiment of this invention. As mentioned above, "antique glass" or glass having an "antique pattern" therein means glass having random striations (grooves) running generally therethrough in random directions/angles. For purposes of example only, see FIG. 6 which illustrates antique glass made according to example embodiments of this invention so as to have random striations 65 defined in a surface thereof. Many of the striations 65 intersect one another, while all need not do so. Moreover, many of the striations are generally straight, while others may be curved in certain embodiments as shown in FIG. 6.

Figure 7:
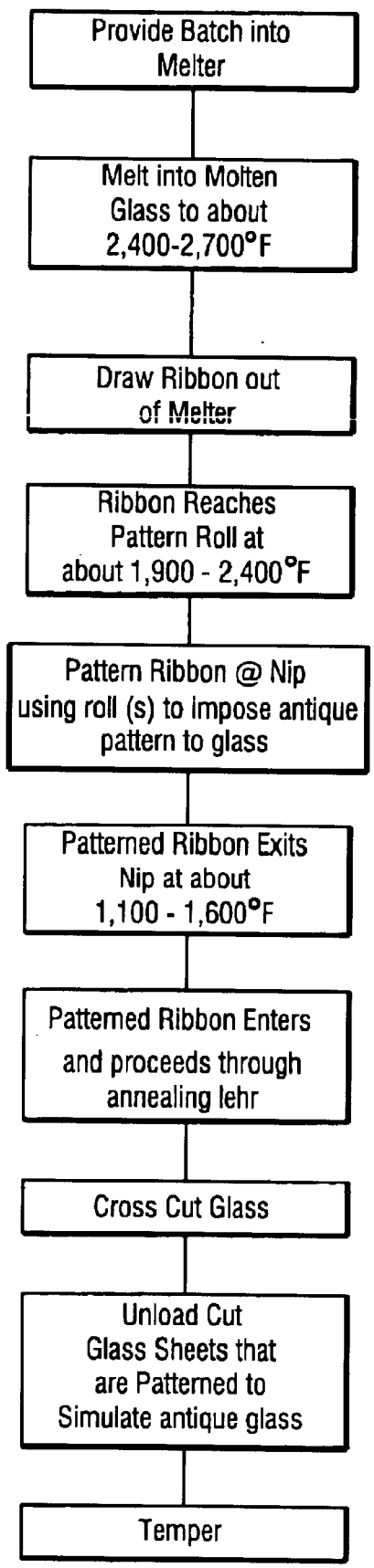
FIG. 7 is a flow chart illustrating various steps taken in the manufacture of the antique glass of FIG. 6 according to an example embodiment of this invention.

In making antique pattern glass according to the FIGS. 6–7 embodiment of this invention, the apparatus/method of FIGS. 3–5 is used except that the pattern defined in the exterior surface of pattern roller 35 (which is the inverse of the pattern shown in FIG. 6) is imparted into or onto the glass ribbon so that the ribbon 39 has a pattern including striations 65 defined on its lower surface upon leaving the nip. Like other embodiments herein, the antique pattern here is repeatable. Moreover, in the FIGS. 6–7 embodiment for antique glass, the peaks 55 defined in the exterior surface 53 of the roller need not be as large/pronounced as in the glue-chipped embodiments. For example, in certain example FIGS. 6–7 embodiments where antique glass is made, the average depth "d" of the bottom of the valleys relative to the top of adjacent peaks 55 is from about 0.0001–0.030 inches, more preferably from about 0.0005–0.005 inches, and most preferably from about 0.001 to 0.002 inches (e.g., 0.0015 inches). The average depth "d" of valleys to adjacent peaks may vary depending upon the type of pattern desired to be imparted onto the glass ribbon 39. The depth "d" (which in turn defines the depth of striations 65 in the surface of the resulting glass sheet in FIG. 6) of different lines/ridges on the surface of roller 35 may be approximately constant across the entire surface of the roller in some embodiments of this invention, but may vary to different depths across the surface of the roller in other embodiments of this invention.

Once given the above disclosure, various other modifications, features, and/or improvements will become apparent to the skilled artisan. Such other features, modifications, and/or improvements are thus considered to be a part of this invention, the scope of which is to be determined by the following claims.

What is claimed is:

1. A method of manufacturing patterned glass sheets having a visual appearance simulating an appearance of antique glass, the method comprising:
   providing a furnace or melter;
   providing first and second opposing rollers which define a nip there between, and providing at least one of the first and second rollers with an antique glass pattern comprising a plurality of intersecting ridges of different lengths defined in an exterior surface thereof, wherein at least some of the ridges intersect one another at angles of from about 5–80 degrees;
   a ribbon of glass exiting the furnace or melter and proceeding toward the nip;
   the ribbon of glass reaching the nip between the first and second rollers at a temperature of from about 1,900–2,400° F.;
   forming an antique pattern in at least one surface of the glass ribbon in the nip, by causing the antique glass pattern to be transferred from the at least one roller to the ribbon of glass;
   the patterned glass ribbon exiting the nip at a temperature of from about 1,100–1,600° F.;
   annealing the patterned glass ribbon after the ribbon has left the nip; and
   cutting the patterned glass ribbon into a plurality of sheets which simulate antique glass sheets from a visual perspective.

2. The method claim 1, wherein the antique pattern is provided on only one of the first and second rollers.

3. The method claim 1, wherein each of the first and second rollers are liquid cooled in a manner such that liquid within the first and second rollers is at a temperature substantially less than a temperature of the glass ribbon when the ribbon is in the nip between the first and second rollers.

4. The method of claim 1, wherein an average height of the ridges is from about 0.0001–0.030 inches.

5. The method of claim 1, wherein an average height of the ridges is from about 0.0005–0.005 inches.

6. The method of claim 1, wherein the ribbon of glass reaches the nip between the first and second rollers at a temperature of from about 2,000–2,300° F.

7. The method of claim 6, wherein the ribbon of glass reaches the nip between the first and second rollers at a temperature of from about 2,100–2,200° F.

8. A method of manufacturing antique patterned glass sheets, the method comprising:
   providing a furnace or melter;
   providing first and second opposing rollers which define a nip therebetween, and providing at least one of the first and second rollers with a pattern including a plurality of intersecting ridges of different lengths defined in an exterior surface thereof;
   a ribbon of glass exiting the furnace or melter and proceeding toward the nip;
   the ribbon of glass reaching the nip between the first and second rollers at a temperature of from about 1,900–2,400° F;
   forming a pattern in at least one surface of the glass ribbon at the nip, by causing the pattern to be transferred from the at least one roller to the ribbon of glass;
   the patterned glass ribbon exiting the nip at a temperature of from about 1,100–1,600° F.; and
   cutting the patterned glass ribbon into a plurality of antique patterned glass sheets.

9. A method of manufacturing antique patterned glass sheets, the method comprising:
   providing a furnace or melter;
   providing first and second opposing rollers which define a nip therebetween, and providing at least one of the first and second rollers with a pattern including a plurality of intersecting ridges of different lengths defined in an exterior surface thereof;
   a ribbon of glass exiting the furnace or melter and proceeding toward the nip, wherein the glass reaches the nip between the first and second rollers at a temperature of from about 2,100–2,200° F.;
   forming an antique pattern in at least one surface of the glass ribbon at the nip, by causing the pattern to be transferred from the at least one roller to the ribbon of glass;
   the antique patterned glass ribbon exiting the nip at a temperature of from about 1,100–1,600° F.; and
   cutting the antique patterned glass ribbon into a plurality of antique patterned glass sheets.

* * * * *